UNITED STATES PATENT OFFICE.

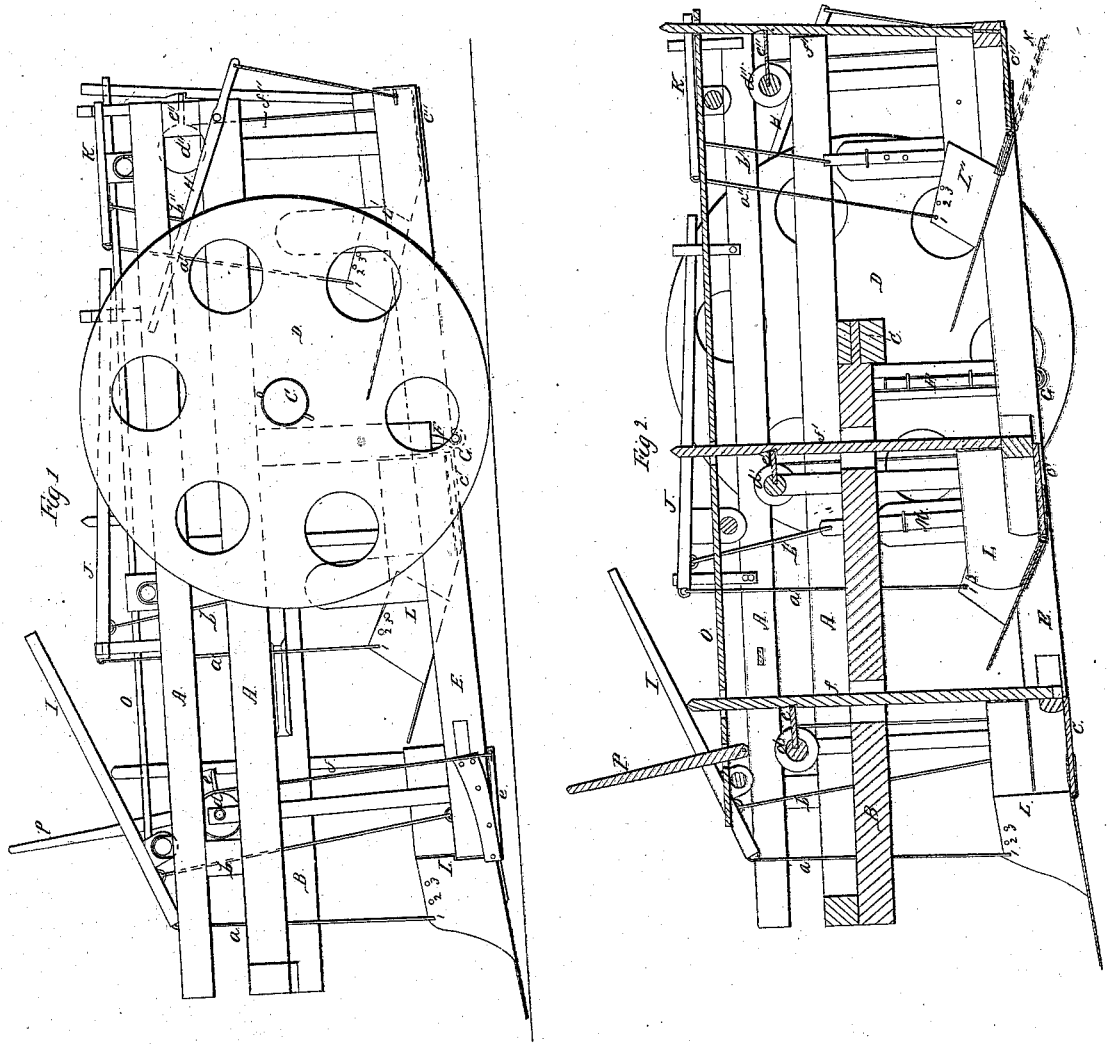

JONATHAN WILKINSON, OF HOPEWELL COTTON WORKS P. O., PENNSYLVANIA.

SELF LOADING AND UNLOADING CART.

Specification of Letters Patent No. 12,804, dated May 1, 1855.

*To all whom it may concern:*

Be it known that I, JONATHAN WILKINSON, of Hopewell Cotton Works P. O., in the county of Chester and State of Pennsylvania, have invented certain new and useful Improvements in Self Loading and Unloading Carts for the Removal of Earth, Gravel, &c.; and I do hereby declare that the following is a full and exact description of the construction and operation of the same, reference being had to the accompanying drawings, making a part of this specification.

The most prominent feature of my improved cart consists in the arrangement in one vehicle of a series of two, three, or more comparatively small scoop shovels or scrapers, with suitable carrying boxes attached, so constructed and arranged that each of the boxes constituting the series can be loaded in succession, independently of the others, while the vehicle is in motion, thus rendering it unnecessary, owing to the comparative shortness from front to rear of the scoops to be forced into the substance with which the cart is to be loaded, and the smallness of the quantity to be taken up by each, that a strong team should be employed, or an extra team hitched on while the cart is being loaded, as is usually the case in taking up a sufficient load for an ordinary team in a cart having but one large scoop; the arrangement for unloading being such that when the vehicle is removed to the place where the load is to be deposited the contents of all the boxes can be dumped simultaneously without stopping the team, and leave the load spread out in a layer of uniform, or nearly uniform, thickness. I have also made some improvements in the details of the construction and arrangement of my cart, which will be described hereafter.

I will now proceed to describe the construction and operation of my cart, by reference to the annexed drawings.

Figure 1 is a side elevation of a vehicle constructed in accordance with my improvements. Fig. 2 is a vertical longitudinal section through the center of the same.

The same letters of reference in each of the figures indicate corresponding parts of the apparatus.

The drawings may be considered as representing a cart from which a section comprising one scoop and its box has been cut off from the rear end, it being deemed unnecessary, in order fully to illustrate the construction and operation of the apparatus to delineate more than three scoops and boxes of the series, as they are all intended to be precisely alike, with the exception of the one at the front end of the vehicle, and it may be also constructed like the others, if preferred.

In the following description, when reference is made to the levers by which the scoops, boxes, and adjustable frame are operated, for convenience, the word "lever" will be employed to designate either a single lever, or a pair of levers operating conjointly for the same purpose, it being intended to use either single levers or pairs of them, as may be found best or most convenient.

A, A, represents a fixed frame which is permanently fastened to the axletree of the cart, and to which all the adjustable parts of the vehicle are either directly or indirectly attached.

B is the tongue or shaft to which the team is to be hitched. In the drawings it is represented as being cut off even with the front end of the frame A, A.

C is the axletree, and D, the wheels of the vehicle.

E, is the adjustable frame to which the scoops and boxes are attached, and which is itself attached to the fixed frame through the medium of sliding bars or pieces F, of which there is one on each side of the vehicle. These sliding pieces permit the frame to be raised and lowered to whatever extent may be necessary.

The adjustable frame E, is attached to the lower ends of the sliding pieces F, by a hinge or joint at G, upon which it moves to permit its front or hind end to be raised or lowered as required. The rear end of the adjustable frame is raised and lowered by operating the lever H, and the front end, as well as the front scoop and box, by operating the lever I.

The front scoop L, with its box, is represented as being attached to the adjustable frame without the intervention of sliding pieces like M and M', as in the case of the scoops and boxes L' and L'', but it is evident that it may be attached to the frame in the same manner as the others, and be operated in the same way. The lever I, is represented as being detached from its detent, and the front end of the adjustable frame and front scoop let down into the position for being loaded.

The levers for operating the scoops and boxes are connected to them by rods $a$, $b$; $a'$, $b'$; and $a''$, $b''$. The rods $a$, $a'$ and $a''$, for operating the scoops are attached to the levers at a greater distance from their fulcrums than the rods $b$, $b'$ and $b''$, for operating the boxes, so that operating the levers moves the scoops through a greater space than it does the boxes. The rods $b'$ and $b''$, are attached to the upper ends of the slides M and M', and by elevating or depressing these slides, operate their respective boxes.

The scoops and boxes are constructed so that the front part or scoop moves up and down on a hinge or joint whose center of motion runs from side to side of the vehicle, and the bottom of each box also works on a hinge having the same center of motion as the scoop, so that it can be let down any distance required for dumping the load, as indicated in red at N, in Fig. 2.

The bottoms of the boxes, or the dumping gates $c$, $c'$, and $c''$, are connected to the windlasses $d$, $d'$, and $d''$, by cords, chains, or suitable connections, and to the windlasses are attached arms or pieces $e$, $e'$, and $e''$, which lock into notches in the spring bars $f$, $f'$, and $f''$, these bars serving as detents by which, through the medium of the windlasses, the dumping gates are kept closed.

The upper ends of the spring detents $f$, $f'$ and $f''$, are connected together by the rod or bar O. This rod O is operated by the lever P. By pushing back the lever P, the detents $f$, $f'$ and $f''$ are all moved back so as to release the arms $e$, $e'$ and $e''$, and thus the rear ends of the dumping gates $c$, $c'$ and $c''$, are dropped simultaneously.

The scoops have holes 1, 2, 3, into either of which the rods $a$, $a'$ and $a''$, may be fastened. This device furnishes a means of graduating the motion of the scoops, in addition to that of operating the levers I, J and K.

The levers for operating the adjustable frame, scoops, and dumping apparatus may be arranged either to be worked by an operator riding on the vehicle, or standing on the ground by its side, as may be preferred.

If the earth, etc., to be removed lies in a compact state, it should be loosened up by plowing, or otherwise, preparatory to its being loaded on to the cart.

The operation of my apparatus is as follows: The levers H, I, J, K, being locked down in their detents, the scoops, boxes, and adjustable frame all elevated and the dumping gates closed, suppose the front scoop to have arrived at, or nearly at, the place where it is desired to commence loading—the operator first detaches the lever H, from its detent so as to lower the rear end of the adjustable frame E; and then detaches the lever I, and lets down the front scoop L, and retains it at the proper depth until a sufficient quantity of earth, &c., is taken up. The lever is then pressed down and locked in its detent, which raises the front of the scoop considerably above a horizontal line, so that it forms the front part of the box, and prevents the contents from falling out at that side. The first of the series being thus loaded and elevated, and the vehicle still advancing, the operator, before the front end of the second scoop L', arrives at the point from which the first was raised, by detaching the lever J lets down the second scoop, so that it may commence taking up its load where the first one finished. When it has taken up a sufficient quantity, it is raised by depressing and locking its lever as was done with the first scoop; and so on until all of the series composing the cart are loaded. The rear end of the adjustable frame is then elevated by depressing and locking the lever H, when the vehicle is ready to be removed to the place where it is desired to dump the load. When arrived at the place of deposit, the lever P, which operates the dumping gates, is moved in the proper direction, which opens all of them simultaneously, and permits the contents of the boxes to pass out and be spread by the forward motion of the vehicle, in a layer of uniform, or nearly uniform thickness.

It will be observed from the foregoing, that there is no occasion for stopping the vehicle either in loading or unloading, so that no time is lost in that way. It is evident, therefore, from the facility with which carts constructed on my plan can be loaded and unloaded, that, by employing a gang of such carts, earth, &c., can be transported from one locality to another with great rapidity and economy of manual labor.

I contemplate that my improved cart may be used for various purposes, such as grading railroads, or common roads, and for changing soils from one locality to another, which in many cases, is a very desirable object.

It is well known that, in scoop carts containing but one large scoop, it is necessary to employ a more powerful team while the vehicle is being loaded than is requisite for hauling the load to the place of deposit; or otherwise, if a team of only sufficient strength to haul an ordinary load is used, it becomes necessary, in most cases, while loading, to hitch on an extra team, in order to take up a sufficient load. This is a necessary consequence of the construction of such carts. The scoop being of considerable length from front to rear is liable to clog before a sufficient quantity of earth, &c., for a load is forced into it, and the point of the scoop must be run at a considerable depth below the surface in order to afford enough of resistance to push the earth to the back end of the scoop box, thus occasioning the necessity for the use of a team of extra strength, while loading. These difficulites are to a great extent, if not entirely, obviated in my improved cart.

I do not intend to confine myself, in the construction of my carts, to the precise method set forth in the foregoing specification, as it is evident that various modifications of it may be made without departing from main features of my invention.

I claim as new, and of my invention in self-loading and unloading carts,

1. The combination and arrangement in one vehicle, of a series of two, three, or more comparatively small scoop shovels or scrapers, and their respective carrying boxes, so that each of the series can be loaded in succession independently of the others, while the vehicle is in motion, thus, owing to the shortness from front to rear of the scoops to be forced into the substance with which the cart is to be loaded, and the smallness of the quantity to be taken up by each, avoiding the necessity of employing a powerful team, or of hitching on an extra team while the vehicle is being loaded, as is usually the case in taking up a sufficient load for an ordinary team, in a cart having but one large scoop; and so that, when the vehicle is removed to the place where the load is to be deposited, all the boxes of the series can be dumped or unloaded simultaneously, without stopping the team, and leave the contents spread out in a layer of uniform, or nearly uniform depth, the whole being constructed and operated in the manner, and for the purposes, set forth in the foregoing specification, or in any other manner substantially equivalent thereto.

2. I also claim the manner of operating the scoops and boxes by means of levers connected to them by two rods, or their equivalents, to each lever, the one attached to the box being connected with the lever nearer its fulcrum than the one attached to the scoop, so that operating the lever will move the scoop through a greater space than it does the box, thus enabling the scoop to be depressed a sufficient distance to take up its portion of the load, and then elevated so as to constitute the front of the carrying box, while, at the same time, the box is elevated by the rod attached to the lever nearest its fulcrum a sufficient distance to be clear of the surface over which the vehicle is to be conveyed, substantially as herein described and set forth.

3. I also claim the manner of attaching the scoop boxes to the adjustable frame, and the adjustable frame to the fixed frame, by means of sliding bars or rods, or their mechanical equivalents, so constructed and arranged that the scoops and boxes are capable of a vertical, but not of a horizontal motion, except as the whole vehicle is moved, thus enabling the scoops while being loaded, to be held firmly, at any desired depth, against the substance to be taken up by them, substantially as herein specified.

In testimony whereof, I have hereunto signed my name before two witnesses.

JONATHAN WILKINSON.

Witnesses:
 ISAAC SPEAR,
 JOSEPH ANDERSON.